UNITED STATES PATENT OFFICE.

WILSON H. STRICKLER, OF COLUMBUS, OHIO.

INSULATING COMPOSITION.

No. 835,142.  Specification of Letters Patent.  Patented Nov. 6, 1906.

Application filed February 16, 1906. Serial No. 301,497.

*To all whom it may concern:*

Be it known that I, WILSON H. STRICKLER, a citizen of the United States, residing at Columbus, in the county of Franklin and State of Ohio, have invented a new and useful Improvement in an Insulating Composition, of which the following is a specification.

This invention relates to an insulating composition composed of fibrous asbestos, comminuted mica, a double silicate of soda, and a solution of soap, and is especially designed for insulating metallic surfaces by direct application to the surface of the metal.

The object of this invention is an inexpensive insulating material which will resist a high electrical voltage, which will produce a thorough insulation, and will resist any and all concussion and vibration imparted to the metal thus insulated and can be applied as conveniently and effectively in repairs as in original application.

In manufacturing my composition I use asbestos sufficiently pulverized yet possessing sufficient length of fiber to neutralize and overcome the inflexibility of the laminated nature of the mica. The mica is comminuted and varies in degree of comminution, dependent upon the requirements of the uses to which the article is to be placed, as can also the amount of mica and asbestos used, dependent upon the increased need for insulation properties, as can also the disposition on the surface of the metal vary as to the location of the asbestos and the mica, dependent upon the requirements of the case.

The composition is as follows: The combination of a thirty-per-cent. silicate of soda with asbestos and mica as I use it avoids objectionable features of unpliability heretofore found in insulating materials in which the silicate forms a part. The silicate before application and use is created a double silicate by the addition thereto and thorough incorporation thereof of about fifteen to twenty per cent. of a strong solution of lime, thereby making the silicate impervious to water or any chemical change. The silicate is also treated at the same time and in the same manner to a strong solution of best soap shavings, (dissolved in hot water,) the per cent. of incorporation being the same— namely, about fifteen or twenty per cent.— which chemically changes its stiff characteristic into pliability.

The metallic surface is first coated with the silicate thus prepared, over which is then given a coating of the asbestos, which is then allowed to dry, after which a coating of the prepared silicate is again given over the asbestos covering, which is then given a coating of comminuted mica. After this has dried as many additional coatings of the mica and asbestos may be given it as may be desired, dependent upon the insulating effect and insulating property needed.

An outside or finishing covering or coating of paint or liquid tar paint neutralized with a strong ten-per-cent. lime solution, or any desired outside covering may then be given to it.

The advantages of an insulation of this kind direct to metallic surfaces lies in its superior insulation, combined with the low cost of manufacture, convenience in application, and resistance to water, concussion, and vibration.

Having thus fully described my invention, what I claim as new, and desire to secure by Letters Patent, is—

1. An insulating material formed of comminuted asbestos comminuted mica, double silicate of soda and a solution of soap.

2. As a new article of manufacture, an insulation composed of a coating of silicate of soda, created a double silicate by the addition and incorporation of a solution of lime, to which is added by incorporation a solution of soap, pulverized asbestos and mica, incorporated therein as described.

WILSON H. STRICKLER.

Witnesses:
ROBERT A. McCLURE,
J. O. SLOAN.